Sept. 30, 1930.  P. L. SCOTT  1,777,051
INJECTOR VALVE
Filed May 17, 1928
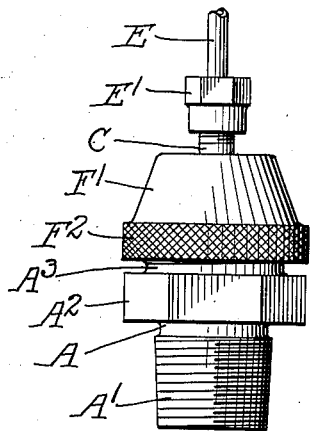
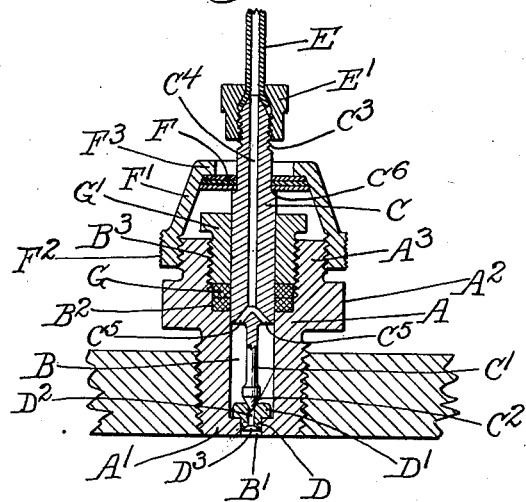
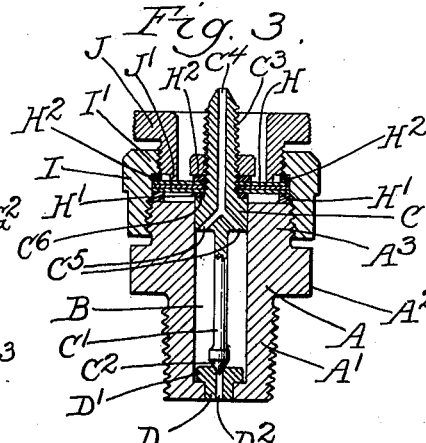
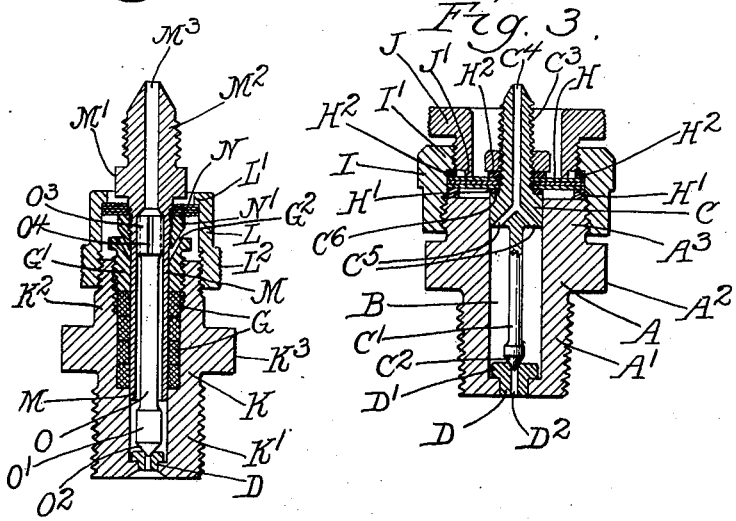
Inventor
Philip L. Scott
by Parker & Carter
Attorneys Patented Sept. 30, 1930

1,777,051

UNITED STATES PATENT OFFICE

PHILIP LANE SCOTT, OF CHICAGO, ILLINOIS, ASSIGNOR TO SUPER-DIESEL TRACTOR CORPORATION, OF LA PORTE, INDIANA, A CORPORATION OF NEW YORK

INJECTOR VALVE

Application filed May 17, 1928. Serial No. 278,357.

This invention relates to a valve and particularly to a spray or injection valve of a type adapted for use in connection with internal combustion engines in which fuel is atomized as injected into the engine. The invention has for one object to provide a valve in which an extremely minute injection opening will be formed in response to hydraulic pressure within the valve. Another object is to provide a valve of this type which will be extremely compact and small and in which the yielding element is located away from the point of fuel discharge. A further object is to provide such a valve construction in which the yielding element can be readily removed and in which this element is separated as far as possible from the heated zone. Other objects will appear from time to time throughout the specification and claims.

My invention is illustrated more or less diagrammatically in the accompanying drawing, wherein:

Figure 1 is a side elevation of one form of the valve;

Figure 2 is a longitudinal cross section of the valve in position in a wall of a cylinder;

Figure 3 is a view similar to Figure 2 illustrating a somewhat modified form of the valve.

Figure 4 illustrates another modified form of the valve.

Like parts are indicated by like characters throughout—

A is a valve casing or housing provided with a reduced exteriorly threaded end $A^1$, an enlarged angular portion $A^2$ and a short exteriorly threaded portion $A^3$, preferably larger than the portion $A^1$.

Within the valve body is a main valve chamber B which is narrowed adjacent the discharge end as at $B^1$ and enlarged adjacent its outer end as at $B^2$ and interiorly threaded as at $B^3$.

C is a valve stem. It is reduced in size at one end as at $C^1$ and the reduced portion terminates in a needle point $C^2$. The reduced part $C^1$ may be somewhat flexible to permit a certain degree of lateral bending. At its outer end the valve stem is threaded as at $C^3$. It is provided with a bore $C^4$ which by means of angularly disposed communication passages $C^5$ $C^5$ communicates with the interior of the valve chamber B. The valve stem is provided adjacent its outer end with a shoulder $C^6$.

D is a seat plug provided with a laterally extended flange $D^1$ adapted to seat on the inner end of the valve casing. $D^2$ is a bore through the seat plug and it may terminate in an outwardly flaring portion $D^3$.

E is a supply conduit by means of which fuel or other fluid is supplied to the valve. $E^1$ is a cap adapted to hold the conduit in position on the outer end of the valve stem.

F is a spring disc member. In the form here shown this disc is formed of several discs forming a laminated spring. The discs are perforated and are positioned about the valve stem, the inner one resting on the shoulder $C^6$. $F^1$ is a cap provided with a knurled edge $F^2$ and an inwardly extending flange $F^3$ which engages the outer edges of the spring disc, thus holding the springs and through them the valve stem in position with relation to the rest of the valve. The tension of the spring and through it the pressure of the needle valve upon the seat plug may be varied by rotation of the cap $F^1$.

G is a packing about the valve stem and it is adjustably and removably held in position by means of a plug or a gland $G^1$.

In the form shown in Figure 3 the parts are generally the same. The valve casing, seat plug and stem are practically identical with those shown in the other figures. A laminated spring disc H is used. It is positioned about the valve stem and seated upon the shoulder in the manner described above. $H^1$ $H^1$ are packings mounted partially against the outer end of the valve casing and partially on the shoulder $C^6$. The spring H rests upon these packings. Similar packings $H^2$ rest upon the outer or upper face of the spring disc.

I is a retaining cap threaded on the outer end of the valve casing and provided with inwardly extending rim or flange $I^1$ which engages the packings $H^2$ and thus holds the spring and through it the valve, in position.

J is a tension adjusting member adjustably mounted within the cap I and provided with a downwardly extending land or ring J¹. This ring or raised land may be brought into contact with the spring disc and it may be adjusted to vary the initial pressure of the disc and to limit its outward movement.

In Figure 4 is shown a further modified form. K is the body portion having a central hollow with an enlarged part in which packing G is situated. In its discharge end is situated a plug D similar to the seat plug shown in Figure 3. K¹ is a reduced portion of the casing threaded exteriorly as shown and K² is an upper reduced portion threaded exteriorly and interiorly adjacent its upper end as shown.

M is a tubular lining and connection member. It is provided adjacent its upper end with an angularly shaped enlargement M¹. It is threaded adjacent its upper end as at M² and has a central bore M³. About the member M is a packing gland G¹ similar to that shown in Figure 2 except that its central perforation terminates at its upper end in a generally conical enlargement G².

N is a spring formed as here shown of a plurality of circular perforated spring discs which are positioned about the member M. N¹ is a nut threaded onto the member M and forming a shoulder upon which the spring N is supported.

L is a spring retaining and adjusting cap open at its top and provided with an inwardly extending flange L¹ which engages the outer edges of the spring N. It is provided at its lower end with a knurled outwardly extending portion L² by means of which it may be engaged for rotation.

O is the valve closing member carrying at its lower end an enlargement O¹ terminating in a needle point O². At its upper end it has an enlargement O³ of substantially the same diameter as the interior of the member M. Through this enlargement are formed one or more slots O⁴ through which fluid forced through the valve and through the passage M³ may reach the interior of the valve proper and so finally pass from the valve when the pressure within is sufficient to raise the valve stem by slightly flexing the spring N. As the valve stem moves the member M moves with it, the two being driven together and fastened thus by a driven fit. The member O may be made in itself slightly flexible or its fit with relation to the sleeve M may be such as to permit slight relative lateral movement of the two, such as a tipping or bending of the member O.

Although I have shown an operative device, still it will be obvious that many changes might be made in size, shape and arrangement of parts without departing materially from the spirit of my invention, and I wish therefore that my showing be taken as in a sense diagrammatic.

The use and operation of my invention are as follows:

The valve is placed in position in any situation where it is desired to atomize liquid fluid. In the form here shown it is designed primarily for use with internal combustion engines in which liquid fuel is to be atomized and injected into the engine for burning. It may, of course, be used in other connections, and the shape and design of the spring is such that its degree of yielding is extremely small. The valve stem is connected with a source of fuel supply and fuel is supplied under pressure, reaching the interior of the valve through the hollow valve stem.

When the pressure is sufficient the stem is raised flexing the spring disc very slightly, and thus the valve stem is permitted under the influence of hydraulic pressure to rise slightly from its seat and an extremely small atomizing orifice is thus formed. The liquid being forced rapidly and under heavy pressure through the small opening is atomized and discharged from the valve.

By reason of the construction shown the spring disc is separated as far as possible from the zone of greatest heat and it may be observed during the operation of the engine, and in case repair or renewal becomes necessary the spring retaining cap and screw may be removed without dismantling the valve entirely and without removing the stem from the valve casing.

I claim:

1. An injector valve comprising a hollow housing, a discharge port therein, a seat associated with the port, a valve member adapted to engage the seat and close the port, a stem carrying the valve member, a tube surrounding and out of contact with the stem except at the end removed from the valve member, means for supplying fluid under pressure to the interior of said tube and through it to the interior of the housing, a yieldable member interposed between the tube and the housing, and means for exerting a pressure on the yielding member to yieldingly force the valve member against its seat.

2. An injector valve comprising a hollow housing, a discharge port therein a seat associated with the port, a valve member adapted to engage the seat and close the port, a stem stem carrying the valve member, a tube surrounding and out of contact with the stem except at the end removed from the valve member, means for supplying fluid under pressure to the interior of said tube and through it to the interior of the housing a yieldable member interposed between the tube and the housing and means for exerting a pressure on the yielding member to yieldingly force the valve member against its seat.

3. An injector valve comprising a hollow housing, a discharge port therein a seat associated with the port, a valve member adapted to engage the seat and close the port, a stem carrying the valve member, a stiff tube surrounding and out of contact with the stem except at the end removed from the valve member, means for supplying fluid under pressure to the interior of said tube and through it to the interior of the housing, a yieldable member interposed between the tube and the housing, and means for exerting a pressure on the yielding member to yieldingly force the valve member against its seat.

4. An injector valve comprising a hollow housing, a discharge port therein, a seat associated with the port, a valve member adapted to engage the seat and close the port, a movable stem carrying the valve member, a tube surrounding and out of contact with the stem except at the end removed from the valve member, means for supplying fluid under pressure to the interior of said tube and through it to the interior of the housing, a yieldable member interposed between the tube and the housing, and means for exerting a pressure on the yielding member to yieldingly force the valve member against its seat.

5. An injector valve comprising a hollow housing a discharge port therein, a seat associated with the port, a valve member adapted to engage the seat and close the port, a movable stem carrying the valve member, a stiff tube surrounding and out of contact with the stem except at the end removed from the valve member, means for supplying fluid under pressure to the interior of said tube and through it to the interior of the housing, a yieldable member interposed between the tube and the housing, and means for exerting a pressure on the yielding member to yieldingly force the valve member against its seat.

6. An injector valve comprising a hollow housing, a discharge port therein, a seat associated with the port, a valve member adapted to engage the seat and close the port, a flexible stem carrying the valve member, a stiff tube surrounding and out of contact with the stem except at the end removed from the valve member, a hydraulic tight packing interposed between the tube and the housing, means for supplying fluid under pressure to the interior of said tube and through it to the interior of the housing, a yielding member interposed between the tube and the housing, means for exerting a pressure on the yielding member to yieldingly force the valve member against its seat.

7. An injector valve comprising a hollow housing, a fluid supply inlet thereto, a discharge port therein, a seat associated with the port, a valve member adapted to engage the seat and close the port and movable means adapted normally to hold the valve member seated, a stem carrying the valve member and a tube surrounding and out of contact with the stem throughout a portion of its length and in contact with the stem throughout a portion of its length, the two supported for relative lateral movement, the valve closing part being attached to that portion of the stem which is out of contact with the tube.

8. An injector valve comprising a hollow housing, a fluid supply inlet thereto, a discharge port therein, a seat associated with the port, a valve member adapted to engage the seat and close the port and movable means adapted normally to hold the valve member seated, a flexible stem carrying the valve member and a tube surrounding and out of contact with the stem throughout a portion of its length and in contact with the stem throughout a portion of its length, the two supported for relative lateral movement, the valve closing part being attached to that portion of the stem which is out of contact with the tube.

9. An injector valve comprising a hollow housing, a fluid supply inlet thereto, a discharge port therein, a seat associated with the port, a valve member adapted to engage the seat and close the port and movable means adapted normally to hold the valve member seated, a movable stem carrying the valve member and a tube surrounding and out of contact with the stem throughout a portion of its length and in contact with the stem throughout a portion of its length, the two supported for relative lateral movement, the valve closing part being attached to that portion of the stem which is out of contact with the tube.

10. An injector valve comprising a hollow housing, a fluid supply inlet thereto, a discharge port therein, a seat associated with the port, a valve member adapted to engage the seat and close the port and movable means adapted normally to hold the valve member seated, a movable stem carrying the valve member and a stiff tube surrounding and out of contact with the stem throughout a portion of its length and in contact with the stem throughout a portion of its length, and the two supported for relative lateral movement, the valve closing part being attached to that portion of the stem which is out of contact with the tube.

11. An injector valve comprising in combination a hollow housing, a seat portion therein, a valve member adapted to be seated in said seat to close the outlet, said member carrying a projection and adapted to be yieldingly held upon its seat, a spring element including a disc bearing upon said projection, means engaging said disc adjacent its outer edge and holding it against outward movement, said means being removably and adjustably mounted on the hollow housing to permit adjustment of pressure upon the spring disc and thereby to permit adjustment of the seating pressure upon the valve member.

12. An injector valve comprising in combination a hollow housing, a seat portion therein, a valve member adapted to be seated in said seat to close the outlet, said member carrying a projection and adapted to be yieldingly held upon its seat, a spring element formed of a plurality of discs mounted about it and bearing upon said projection, a cap engaging said discs adjacent their outer edges and holding them against outward movement, said cap being removably and adjustably mounted on the hollow housing to permit adjustment of pressure upon the spring discs and thereby to permit adjustment of the seating pressure upon the valve member.

13. An injector valve comprising in combination a hollow housing, a seat portion therein, a valve member adapted to be seated in said seat to close the outlet, said member carrying a projection and adapted to be yieldingly held upon its seat, a spring element formed of a plurality of discs mounted about it and bearing upon said projection, a cap engaging said discs adjacent their outer edges and holding them against outward movement, said cap being removably and adjustably mounted on the hollow housing to permit adjustment of pressure upon the spring discs and thereby to permit adjustment of the seating pressure upon the valve member, said valve stem being perforated throughout a portion of its length to form a passage for the liquid to the interior of said valve.

14. An injector valve comprising in combination a hollow housing, a removable raised seat portion therein, provided with a flaring outlet, a valve member adapted to be seated in said seat to close the outlet, said member carrying a projection and adapted to be yieldingly held upon its seat, a spring element formed of a plurality of discs mounted about it and bearing upon said projection, a cap engaging said discs adjacent their outer edges and holding them against outward movement, said cap being removably and adjustably mounted on the hollow housing to permit adjustment of pressure upon the spring discs and thereby to permit adjustment of the seating pressure upon the valve member, said valve stem being perforated throughout a portion of its length to form a passage for the liquid to the interior of said valve.

Signed at Chicago, county of Cook, and State of Illinois, this 14th day of May, 1928.

PHILIP LANE SCOTT.